US007353196B1

(12) United States Patent
Bobbitt et al.

(10) Patent No.: US 7,353,196 B1
(45) Date of Patent: Apr. 1, 2008

(54) CONFIGURING DYNAMIC DATABASE PACKAGESET SWITCHING FOR USE IN PROCESSING BUSINESS TRANSACTIONS

(75) Inventors: Charles P. Bobbitt, Dallas, TX (US); Steven G. Doughty, Plano, TX (US)

(73) Assignee: Computer Sciences Corporation, Austin, TX (US)

( * ) Notice: Subject to any disclaimer, the term of this patent is extended or adjusted under 35 U.S.C. 154(b) by 974 days.

(21) Appl. No.: 09/699,021

(22) Filed: Oct. 27, 2000

Related U.S. Application Data

(60) Provisional application No. 60/162,509, filed on Oct. 29, 1999.

(51) Int. Cl.
*G06Q 40/00* (2006.01)
(52) U.S. Cl. .................. 705/35; 705/36 R; 707/102
(58) Field of Classification Search ............ 705/35, 705/36, 38, 42, 36 R; 707/102, 201, 2
See application file for complete search history.

(56) References Cited

U.S. PATENT DOCUMENTS

| | | | |
|---|---|---|---|
| 4,878,167 A | 10/1989 | Kapulka et al. | |
| 5,099,422 A | 3/1992 | Foresman et al. | |
| 5,191,522 A | 3/1993 | Bosco et al. | |
| 5,201,044 A | 4/1993 | Frey, Jr. et al. | |
| 5,233,513 A | 8/1993 | Doyle | |
| 5,257,366 A | 10/1993 | Adair et al. | |
| 5,386,566 A | 1/1995 | Hamanaka et al. | |

(Continued)

FOREIGN PATENT DOCUMENTS

EP 0 280 773 9/1988

(Continued)

OTHER PUBLICATIONS

"@ Fault A Commitment to Consistency," Computer Sciences Corporation, Copyright 2000, pp. 1-2.

(Continued)

*Primary Examiner*—Thomas A. Beach
(74) *Attorney, Agent, or Firm*—Meyertons, Hood, Kivlin, Kowert & Goetzel, P.C.; Eric B. Meyertons

(57) ABSTRACT

A system and method for dynamic selection of a database identifier, associated with a database, based on application program requirements in a Financial Service Organization (FSO) business transaction processing system. Developers may build application programs for FSO business transactions with increased flexibility to changing business requirements and reduced development time. The dynamic database packageset software, which may comprise of a dynamic database packageset table, may provide functionality to isolate the FSO application program source code from changes to the FSO database. The FSO computer system may include one or more processing parameters. A processing parameter may have one key definition, one or more key values with one processing parameter value assigned to each key value. The dynamic database packageset switching table may include user defined keys and their associated database identifier values. Configuring the dynamic packageset switching table may include defining user defined keys and their associated database identifier values. User defined key definitions may include providing a user interface for the selection of one or more data elements to be used as key elements in the key definition. The user interface may also allow the specification of a sequence in which the key elements will appear in the key definition.

15 Claims, 16 Drawing Sheets

U.S. PATENT DOCUMENTS

| | | | |
|---|---|---|---|
| 5,394,555 A | 2/1995 | Hunter et al. | |
| 5,434,994 A | 7/1995 | Shaheen et al. | |
| 5,455,947 A | 10/1995 | Suzuki et al. | |
| 5,483,632 A | 1/1996 | Kuwamoto et al. | |
| 5,499,330 A | 3/1996 | Lucas et al. | |
| 5,504,674 A | 4/1996 | Chen et al. | |
| 5,523,942 A | 6/1996 | Tyler et al. | |
| 5,524,205 A | 6/1996 | Lomet et al. | |
| 5,550,976 A | 8/1996 | Henderson et al. | |
| 5,586,310 A | 12/1996 | Sharman | |
| 5,638,508 A | 6/1997 | Kanai et al. | |
| 5,689,706 A | 11/1997 | Rao et al. | |
| 5,710,915 A | 1/1998 | McElhiney | |
| 5,721,915 A | 2/1998 | Sockut et al. | |
| 5,732,397 A | 3/1998 | De Tore et al. | |
| 5,742,820 A * | 4/1998 | Perlman et al. | 707/201 |
| 5,745,901 A | 4/1998 | Entner et al. | |
| 5,768,505 A | 6/1998 | Gilchrist et al. | |
| 5,768,506 A | 6/1998 | Randell | |
| 5,797,134 A | 8/1998 | McMillan et al. | |
| 5,832,481 A | 11/1998 | Sheffield | |
| 5,864,679 A | 1/1999 | Kanai et al. | |
| 5,867,494 A | 2/1999 | Krishnaswamy et al. | |
| 5,870,711 A | 2/1999 | Huffman | |
| 5,870,725 A * | 2/1999 | Bellinger et al. | 705/45 |
| 5,870,746 A | 2/1999 | Knutson et al. | |
| 5,873,066 A | 2/1999 | Underwood et al. | |
| 5,881,379 A | 3/1999 | Beier et al. | |
| 5,892,905 A * | 4/1999 | Brandt et al. | 713/201 |
| 5,907,848 A | 5/1999 | Zaiken et al. | |
| 5,909,683 A | 6/1999 | Miginiac et al. | |
| 5,930,759 A | 7/1999 | Moore et al. | |
| 5,933,816 A | 8/1999 | Zeanah et al. | |
| 5,937,189 A | 8/1999 | Branson et al. | |
| 5,940,809 A * | 8/1999 | Musmanno et al. | 705/35 |
| 5,950,169 A | 9/1999 | Borghesi et al. | |
| 5,956,719 A * | 9/1999 | Kudo et al. | 707/10 |
| 5,987,434 A | 11/1999 | Libman | |
| 5,991,733 A | 11/1999 | Aleia et al. | |
| 5,991,756 A | 11/1999 | Wu | |
| 6,003,033 A | 12/1999 | Amano et al. | |
| 6,038,393 A | 3/2000 | Iyengar et al. | |
| 6,049,665 A | 4/2000 | Branson et al. | |
| 6,064,983 A | 5/2000 | Koehler | |
| 6,081,832 A | 6/2000 | Gilchrist et al. | |
| 6,092,049 A | 7/2000 | Chislenko et al. | |
| 6,105,007 A | 8/2000 | Norris | |
| 6,112,209 A | 8/2000 | Gusack | |
| 6,115,690 A | 9/2000 | Wong | |
| 6,134,582 A | 10/2000 | Kennedy | |
| 6,163,770 A | 12/2000 | Gamble et al. | |
| 6,185,540 B1 | 2/2001 | Schreitmueller et al. | |
| 6,202,070 B1 | 3/2001 | Nguyen et al. | |
| 6,226,623 B1 | 5/2001 | Schein et al. | |
| 6,236,975 B1 | 5/2001 | Boe et al. | |
| 6,272,482 B1 | 8/2001 | Mckee et al. | |
| 6,289,339 B1* | 9/2001 | Weber | 707/4 |
| 6,336,096 B1 | 1/2002 | Jernberg | |
| 6,341,287 B1 | 1/2002 | Sziklai et al. | |
| 6,385,612 B1 | 5/2002 | Troisi | |
| 6,438,563 B1* | 8/2002 | Kawagoe | 707/201 |
| 6,442,533 B1 | 8/2002 | Hinkle | |
| 6,446,086 B1 | 9/2002 | Baratlett et al. | |

FOREIGN PATENT DOCUMENTS

| | | |
|---|---|---|
| EP | 0 465 018 | 1/1992 |
| EP | 0 836 779 | 4/1998 |
| EP | 0 926 608 | 6/1999 |

OTHER PUBLICATIONS

Merlin, Jr., William F., "Collision Course With the Colossus Program: How to Deal With It," The Merlin Law Group May 2000, Tampa, FL, pp. 1-17.

Merlin, Jr., William F., "Colossus: What We Know Today," The Merlin Law Group, Aug. 2000, Tampa, FL, pp. 1-.

Merlin, Jr., William F., "Overcoming Allstate's Trade Secrets and Work-Product Objections," The Merlin Law Group Mar. 2000, Tampa, FL, pp. 1-31.

Mead, Jay, "Technical Communication," Aug. 1998, V. 45, N. 3, pp. 353-380.

Borland, Russel, "Running Microsoft Outlook 97," Microsoft Press, 1997.

Juhl, Randy P., "The OTC Revolution;" Drugtopics.com; Mar. 3, 1997, pp. 1-9.

Scopus and Entrust Technologies to Deliver World's First Secure Customer Care Solution for the Financial Services Market; PR Newswire dated Nov. 5, 1997.

Scopus and Entrust: Call Center Sales Helper is Unveiled; American Banker, Nov. 10, 1997, vol. 162, Issue 217.

Continuum Connections, vol. I, No. 1, The Continuum Company, Inc., Nov. 1991, 16 pages.

Continuum Connections, vol. I, No. 2, The Continuum Company, Inc., Jan./Feb. 1992, 17 pages.

Continuum Connections, vol. I, No. 3, The Continuum Company, Inc., Mar./Apr. 1992, 16 pages.

Continuum Connections, vol. I, No. 4, The Continuum Company, Inc., Jul./Aug. 1992, 15 pages.

Continuum Connections, vol. II, No. 1, The Continuum Company, Inc., Oct./Nov. 1992, 16 pages.

Continuum Connections, vol. II, No. 2, The Continuum Company, Inc., Dec./Jan. 1993, 24 pages.

Continuum Connections, vol. II, No. 3, The Continuum Company, Inc., Mar./Apr. 1993, 16 pages.

Continuum Connections, vol. II, No. 4, The Continuum Company, Inc., Jul./Aug. 1993, 16 pages.

Continuum Connections, vol. II, No. 5, The Continuum Company, Inc., Nov./Dec. 1993, 20 pages.

Continuum Connections, vol. II, No. 6, The Continuum Company, Inc., Jan./Feb. 1994, 19 pages.

Continuum Connections, vol. III, No. 1, The Continuum Company, Inc., Mar./Apr. 1994, 24 pages.

Continuum Connections, vol. III, No. 2, The Continuum Company, Inc., Nov./Dec. 1994, 20 pages.

Continuum Connections, vol. III, No. 3, The Continuum Company, Inc., Mar./Apr. 1995, 16 pages.

Continuum Connections to the Americas, vol. 1, No. 1, The Continuum Company, Inc., Sep. 1995, 49 pages.

Continuum Connections, vol. III, No. 4, The Continuum Company, Inc., Oct./Nov. 1995, 24 pages.

Continuum Connections to the Americas, vol. 2, No. 1, The Continuum Company, Inc., Jan. 1996, 59 pages.

Continuum Connections to the Americas, vol. 2, No. 2, The Continuum Company, Inc., Mar. 1996, 59 pages.

Continuum Connections to the Americas, vol. 2, No. 3, The Continuum Company, Inc., May 1996, 51 pages.

Continuum Connections to the Americas, vol. 2, No. 4, The Continuum Company, Inc., Jul. 1996, 55 pages.

Continuum Connections to the Americas, vol. 2, No. 5, The Continuum Company, Inc., Sep. 1996, 59 pages.

Connections to the Americas, vol. 3, No. 1, CSC Continuum, Jan. 1997, 55 pages.

Connections to the Americas, vol. 3, No. 2, CSC Continuum, Feb. 1997, 55 pages.

Connections to the Americas, vol. 3, No. 3, CSC Continuum, Mar. 1997, 48 pages.

Connections to the Americas, vol. 3, No. 4, CSC Continuum, Apr. 1997, 40 pages.

Connections to the Americas, vol. 3, No. 5, Computer Sciences Corporation, May/Jun. 1997, 66 pages.

Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
International search report application No. PCT/ US 00/ 18016, mailed Nov. 10, 2000.
International search report application No. PCT/US 00/18020, mailed Nov. 10, 2000.

* cited by examiner

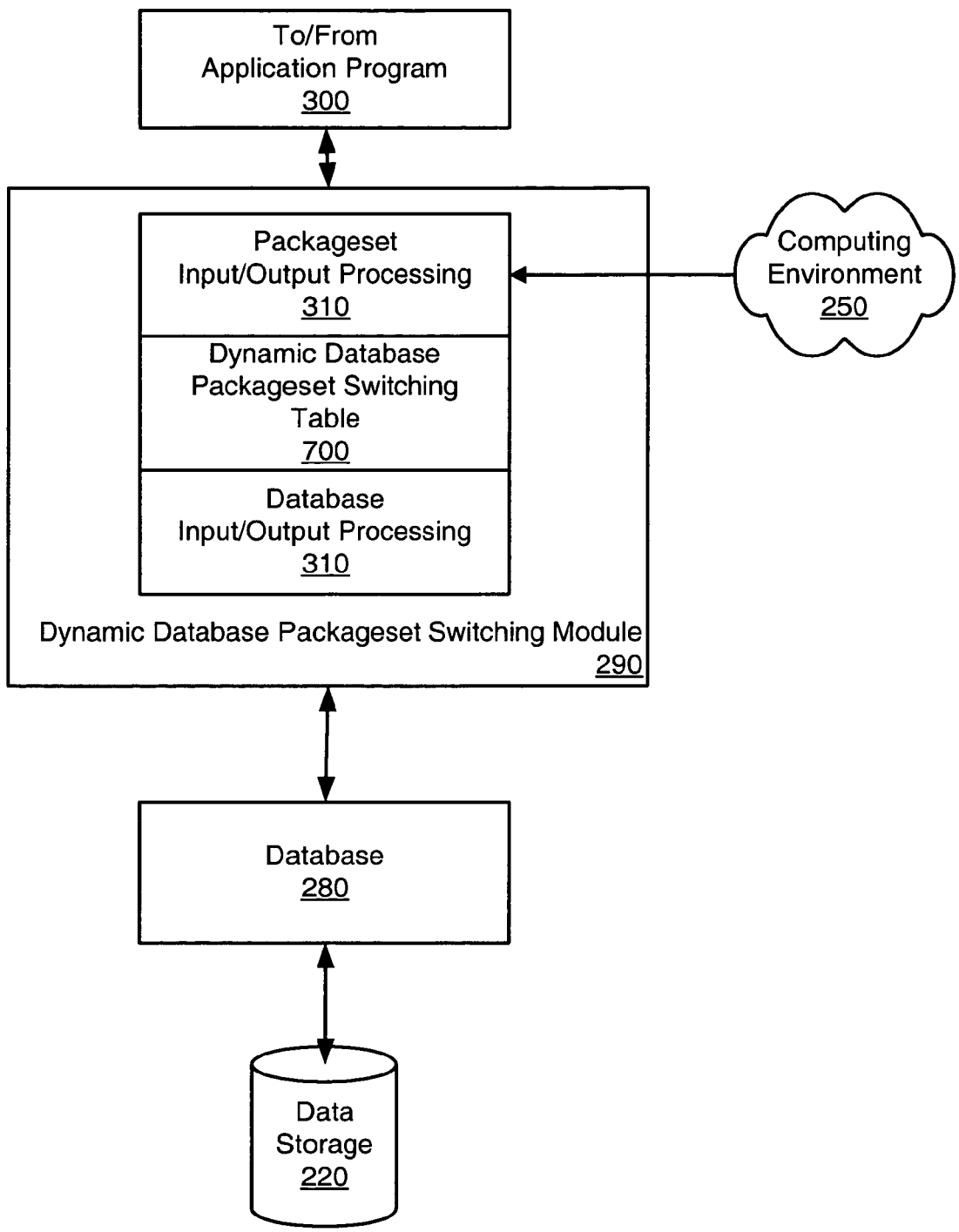
Figur 2a

| DICTIONARY ELEMENTS (122) | USEABLE IN KEYS? (124) |
|---|---|
| A | NO |
| B | NO |
| C | NO |
| D | NO |
| E | NO |
| F | NO |
| G | NO |
| H | NO |
| I | NO |
| J | NO |
| K | NO |
| L | NO |
| M | NO |
| N | YES |
| O | YES |
| P | YES |
| Q | YES |
| R | YES |
| S | YES |
| T | YES |
| U | YES |
| V | YES |
| W | YES |
| X | YES |
| Y | YES |
| Z | YES |

| AVAILABLE KEY ELEMENTS | USEABLE IN KEY? |
|---|---|
| N | NO |
| O | NO |
| P | NO |
| Q | NO |
| R | NO |
| S | NO |
| T | NO |
| U | NO |
| V | YES |
| W | YES |
| X | YES |
| Y | YES |
| Z | YES |

| AVAILABLE KEY ELEMENTS | USE AS KEY FIELD? | SEQUENCE |
|---|---|---|
| V | NO | N/A |
| W | YES | 2 |
| X | YES | 1 |
| Y | NO | N/A |
| Z | YES | 3 |

FIGURE 12

| 152 | 154 | 156 | 158 | 160 |
|---|---|---|---|---|
| KEY FIELD | FIELD SEQUENCE | ELEMENT NAME | FIELD LENGTH | FIELD TYPE |
| X | 1 | COMPANY ID | 2 | NUMERIC |
| W | 2 | CREDIT CARD TYPE | 3 | CHARACTER |
| Z | 3 | ON US/NOT ON US | 1 | CHARACTER |

| ROW | KEY VALUES | | | PACKAGESET SWITCHING TABLE VALUES |
|---|---|---|---|---|
| | X | W | Z | DATABASE IDENTIFIER VALUE |
| 1 | 12 | VIS | Y | NN1234567890123456 |
| 2 | 12 | DIS | Y | NN1234567890123457 |
| 3 | 12 | * | * | NN1234567890123458 |
| 4 | 12 | * | Y | NN1234567890123459 |
| 5 | 14 | VIS | N | NN1234567890123460 |
| 6 | 14 | DIS | N | NN1234567890123461 |
| 7 | * | * | * | NN1234567890123462 |

172 — ROW
174 — KEY VALUES
178 — PACKAGESET SWITCHING TABLE VALUES
175, 176, 177, 179
170

FIGURE 14

CONFIGURING DYNAMIC DATABASE PACKAGESET SWITCHING FOR USE IN PROCESSING BUSINESS TRANSACTIONS

PRIORITY CLAIM

This application claims the benefit of U.S. Provisional Application No. 60/162,509 entitled "Configuring Dynamic Database Packageset Switching For Use In Processing Business Transactions," filed Oct. 29, 1999.

BACKGROUND OF THE INVENTION

1. Field of the Invention

The present invention generally relates to computer software programs and databases to be used in Financial Service Organizations. More particularly, the present invention relates to the dynamic selection of a database identifier, associated with a database, based on application program requirements in a Financial Service Organization (FSO) business transaction processing system.

2. Description of the Related Art

FSOs such as banks, credit unions, etc., use computer systems running software programs to process customer account transactions. The computer systems may include databases for storing data such as the master files of customer account information, transactional data such as customer credit card purchase transactions, processing data such as the processing parameters used in processing transactions, and history data such as log files of daily activities for later batch processing.

Databases may be used in FSO business transaction processing systems to store, manage and retrieve data for a variety of applications. In many instances, the databases may be extremely large. The contents of the database may often occupy memory space measured in hundred's of gigabytes. When application programs need to access enormous amounts of data on a transactional basis, whether in batch mode or real-time mode, the FSO business transaction processing systems often utilize commercially available database products. One embodiment of a commercially available database product is the DB2 database from International Business Machines (IBM).

Some nomenclature is introduced here to aid in the understanding of terminology used. A database packageset contains information needed by the FSO database software to locate and access data in the most efficient way for a particular application program in the FSO business transaction processing system. Database packageset switching occurs when the database packageset values associated with one application program are changed to the database packageset values associated with another application program in the same business transaction processing system. Dynamic database packageset switching occurs when the database packageset values associated with one application program are changed in real-time to the database packageset values associated with another application program in the same business transaction processing system. FSO database environmental variables and database registry values may contain information to control a specific database environment within the FSO business transaction processing system. The user may change environmental variables and registry values to change the FSO database environment.

An example of an FSO that may use such a business transaction processing system is a credit card institution. A credit card institution may issue credit cards to customers of the FSO. The credit card institution may also issue credit cards on behalf of client businesses such as department stores. The credit card institution may also acquire and process credit card transactions from customers and client businesses such as department stores. For example, a credit card institution may issue its own credit card. The credit card institution may also have a client department store. The credit card institution may issue a credit card under the department store's name, and may collect and process all credit card transactions for the department store, charging a fee for each transaction processed. Some of the credit card transactions collected by the credit card institution may be for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

The FSO business transaction processing system may include a data dictionary. A data dictionary may be defined as a collection of descriptions of the data items or elements in the database. For example, the FSO business transaction processing system data dictionary may describe the data elements involved in credit card processing. The data dictionary may describe each of the data elements in the database for credit card processing. Groups of data such as master files and transactions may be comprised of data elements defined in the data dictionary. Examples of data elements in the FSO data dictionary are customer name, credit card type, and card issuer.

The FSO business transaction processing system may include processing parameters used in processing transactions. Processing parameters may be used to apply business logic to the data elements in the transaction during processing. An example of a transaction in the FSO system is a credit card transaction. An example of a processing parameter is a transaction price that may be charged to a client of a credit card institution for processing a credit card transaction. Another example of a processing parameter may be a database identifier, which may point to the location of the data in an FSO database.

The FSO transaction processing application software program may use one or more processing parameters while processing a transaction. A processing parameter may have different values for different transactions. The application software program may examine the values of one or more data elements in the transaction data or database master files to determine the value of a processing parameter for the transaction.

A combination of data elements used to determine the value of a processing parameter may be referred to as a key definition for the processing parameter. The combination of data element values constructed from the key definition may be referred to as a key value. For example, a software program for processing credit card transactions for a credit card institution may use the credit card issuer and card type to determine the database identifier.

Key definitions and key value construction are hardcoded in the source code for the FSO system software programs. Modifying the key definitions and the construction of key values from the key definitions involves modifying the source code for all software programs that use the key definitions, recompiling and relinking the programs, reinstalling the software programs, and possibly modifying the data dictionary and database structure used by the software programs. If more than one FSO use the software programs, customization of key definitions and key value construction for one of the FSOs requires creating and maintaining a customized copy of the source code for the programs.

In some FSO systems, processing parameters, such as the database identifier, and the key values used to identify them may be hardcoded in the source code for the FSO system software programs. Modifying the processing parameters and key values for these systems may involve modifying the source code for all software programs that use the processing parameter, recompiling and relinking the programs, and reinstalling the software programs. In other FSO systems, the processing parameters and key values may be stored in the FSO system database. In these systems, the processing parameters and key values in the database and the key definitions and key value construction in the source code must be synchronized. Thus, the processing parameters and key values in the database may be considered hardcoded as well, as they cannot be modified without also modifying the source code and rebuilding the programs as described above.

During the initial design and development phase of a large scale database application, such as the DB2, it may be necessary or desirable to have different database environments such as Development, Quality, Testing, Production, etc. In addition, the Development environment may also be different, based on the operating system of the computer. It may be necessary or desirable to have one or more databases within one environment. For example, it may be desirable to have a separate database for each development engineer within one DB2 Development environment.

Database limitations may prohibit the use of multiple environments within the same database sub-system. The number of multiple databases within one environment within the same database sub-system may also be limited. One embodiment of a database, which may have some of these limitations is the DB2 database from International Business Machines (IBM). These limitations may often substantially reduce the flexibility of the FSO transaction processing application software program to adapt to changing business requirements. For example, an FSO business transaction processing system may need to expand and respond quickly to integrate a newly acquired FSO or process transactions from a new FSO location. A conventional method to implement these changes often involves changing the source code of the application program. This method is programming intensive, time consuming and costly.

The conventional method for the FSO transaction processing application software program developer to work around database environment restriction may be to manually modify the application program source code, in an off-line mode, to change the environment name in the database registry values. The application source code may be written in higher level programming languages such as COBOL, SQL, C, Visual Basic, C++, Java, and others. Manual switching between the one or more database environments may often involve a shutdown and startup phase for the database sub-system. This is especially undesirable in installations, which attempt to operate continuously.

The conventional method for the FSO transaction processing application software program developer to avoid the difficulty of adding a new database name may be to add new data to an existing database name. As an alternate, the application software program developer could manually modify the application program source code, in an off-line mode, to change the database name in the DB2 registry values to the 'new' database name. The application source code may be written in higher level programming languages such as COBOL, SQL, C, Visual Basic, C++, Java, and others. Both of these methods have drawbacks.

The method of adding new data to an existing DB2 database increases the size, often reducing the system performance and increasing maintenance complexity. The method of changing a database name by using applicable commands in the application programming language i.e. by modifying the source code, significantly increases the development time and the costs. For example, adding a new company database in an FSO may affect the source code in thousands of application programs.

SUMMARY OF THE INVENTION

The present invention provides various embodiments of an improved method and system for dynamically selecting a database packageset table entry based on application program requirements. In some embodiments, data may be stored in tables in the database. In one embodiment, a key definition table, a dynamic database packageset switching table comprising data identifier values and user defined key values may be provided. In one embodiment, user interfaces to enter, modify, and delete data in the key definition, dynamic database packageset switching table may be provided.

In one embodiment, a program executing on an FSO computer system may provide a user interface that may allow a user of the program to construct key definitions for building the processing key values used in locating processing parameters in the FSO system database. The key definitions may be constructed by selecting one or more data elements to be included as key elements in the key definition. The data elements may be displayed for selection in the graphical user interface. The user interface may also provide a method for specifying a sequence in which the key elements will appear in the key definition. The key definitions may be stored in the database in the FSO system. In one embodiment, the key definitions may be stored in a key definition table in the database.

In one embodiment, a program executing on an FSO computer system may provide a user interface that may allow a user of the program to enter processing parameter values and key values. The processing parameter values may be configured for use during the processing of data, including FSO transactions, in the FSO computer system. The key values may be configured for use in locating the processing parameters in the FSO computer system. In one embodiment, processing parameter values and key values may be stored in a dynamic database packageset switching table in the database, with one row in the table including one or more fields for storing a key value and one or more fields for storing database identifier values associated with the key value. In one embodiment, there may be one dynamic database packageset switching table in the database for each processing parameter in the FSO system, with each row in the table including one unique key value for the key definition for the processing parameter, and each row also including the database identifier values locatable using the unique key value. In one embodiment, a key definition may be used to format the user interface for entering key element values. A key element value may be entered for each key element in the key definition, and the key element values may be combined to construct a key value.

In one embodiment, the key definitions, key values, database identifier values may be constructed and stored during the configuration of the FSO system. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system. During reconfiguration, the key definitions, key values, database identifier values constructed during the initial configuration may be modified or deleted, and new key definitions, key values, database identifier values may be added to the FSO system.

BRIEF DESCRIPTION OF THE DRAWINGS

FIG. 2*a* is a block diagram illustrating one embodiment of a dynamic database packageset switching module, a packageset input/output processing sub-system, a dynamic database packageset switching table, a database input/output processing sub-system, a computing environment monitoring sub-system, a database sub-system, a data storage sub-system;

FIG. 10 illustrates one embodiment of a method for selecting data dictionary data elements as key elements available for inclusion in key definitions;

FIG. 11 illustrates one embodiment of a method for selecting key elements to be available for inclusion in a particular key definition from a list of key elements available for inclusion in all key definitions;

FIG. 12 illustrates one embodiment of a method for selecting key elements for inclusion in a key definition from a list of key elements available for inclusion in the key definition;

FIG. 13 illustrates one embodiment of a key definition with examples of parameters that may be included in the key element definitions;

FIG. 14 illustrates one embodiment of a dynamic database packageset switching table for the key definition of FIG. 13 with examples of key values and processing parameter values;

Figure 1:
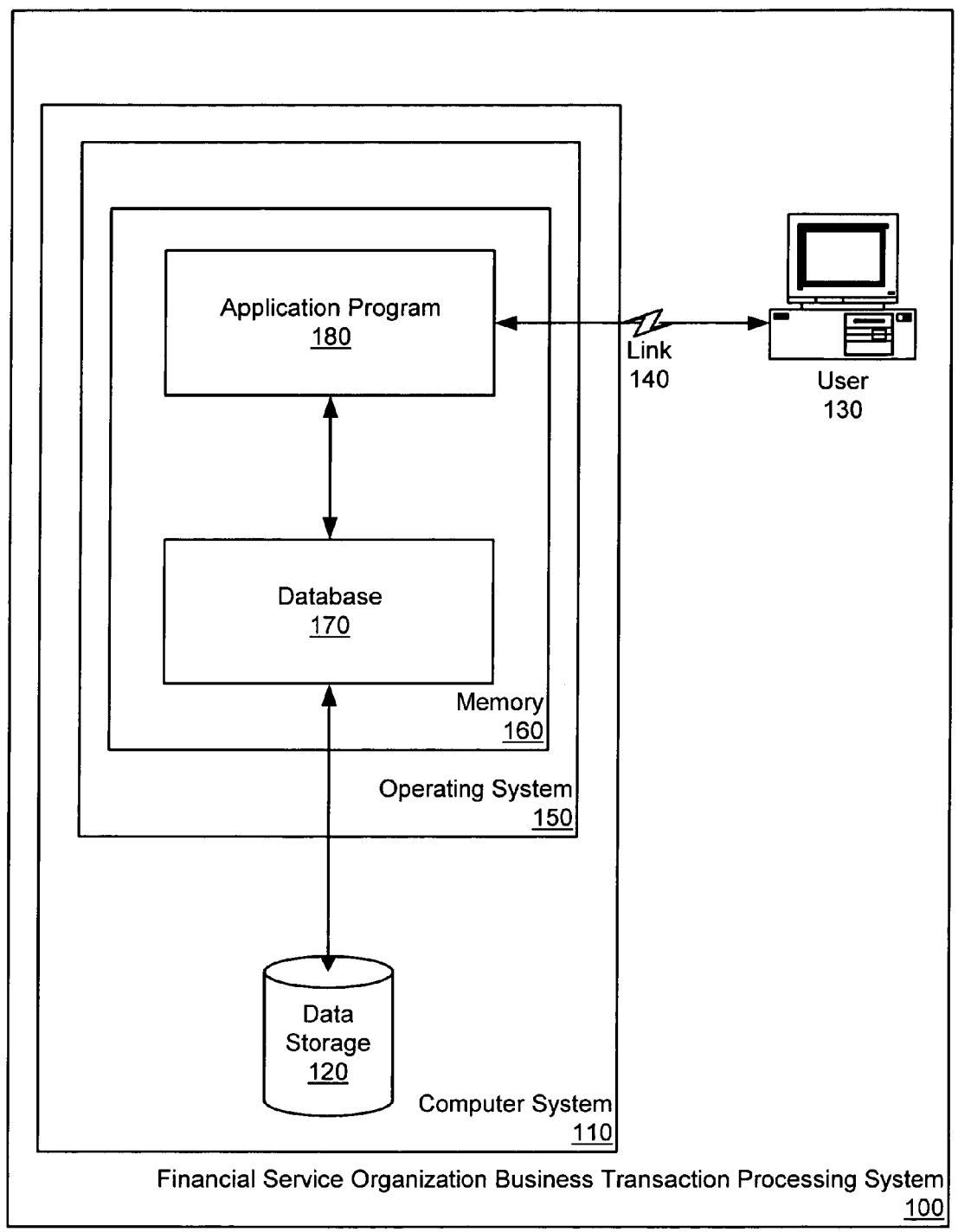
FIG. 1 is a block diagram illustrating the architecture of one embodiment of a financial service organization business transaction processing system with an application program, a database sub-system, a data storage sub-system and a user sub-system in the network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

The term "computer system" as used herein generally describes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may comprise other types of memory or combinations thereof. In addition, the memory medium may be located in a first computer in which the programs are executed, or may be located in a second computer that connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for a dynamic database packageset switching method in a financial service organization business transaction processing system as described herein. The software program(s) may be implemented in any of various ways, including procedure-based techniques, componentbased techniques, and/or object-oriented techniques, among others. For example, the software program may be implemented using ActiveX controls, C++objects, JavaBeans, Microsoft Foundation Classes (MFC), or other technologies or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system such as MVS available from International Business Machines (EBM) Corporation, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

A server program may be defined as a computer program that, when executed, provides services to other computer programs executing in the same or other computer systems. The computer system on which a server program is executing may be referred to as a server, though it may contain a number of server and client programs. In the client/server model, a server program awaits and fulfills requests from client programs in the same or other computer systems. An example of a computer program that may serve as a server is Windows NT server, available from Microsoft Corporation.

FIG. 1—A Block Diagram Illustrating a Prior Art Financial Service Organization Business Transaction Processing System In FIG. 1, an embodiment of a prior art financial service organization business transaction processing system 100 may include a computer system 110, an operating system 150, a user display screen 130 connected to the computer system via a link 140, and a database 170 residing on data storage 120. Computer system 110 includes memory 160 configured to store computer programs for execution on system 100, and a central processing unit (not shown) configured to execute instructions of computer programs residing on system 100. Application program 180 may be stored in memory 160. Database access requests generated by the Application program 180 are processed by the FSO database 170. If requested FSO data is available within the FSO database 170 then it retrieves the requested FSO data from the data storage 120. If requested FSO data is not available within the FSO database 170 then it may send an error message to the Application program 180. The user working at a display screen 130 may need to change the Application program 180 source code to eliminate the FSO database 170 error.

Figure 2:
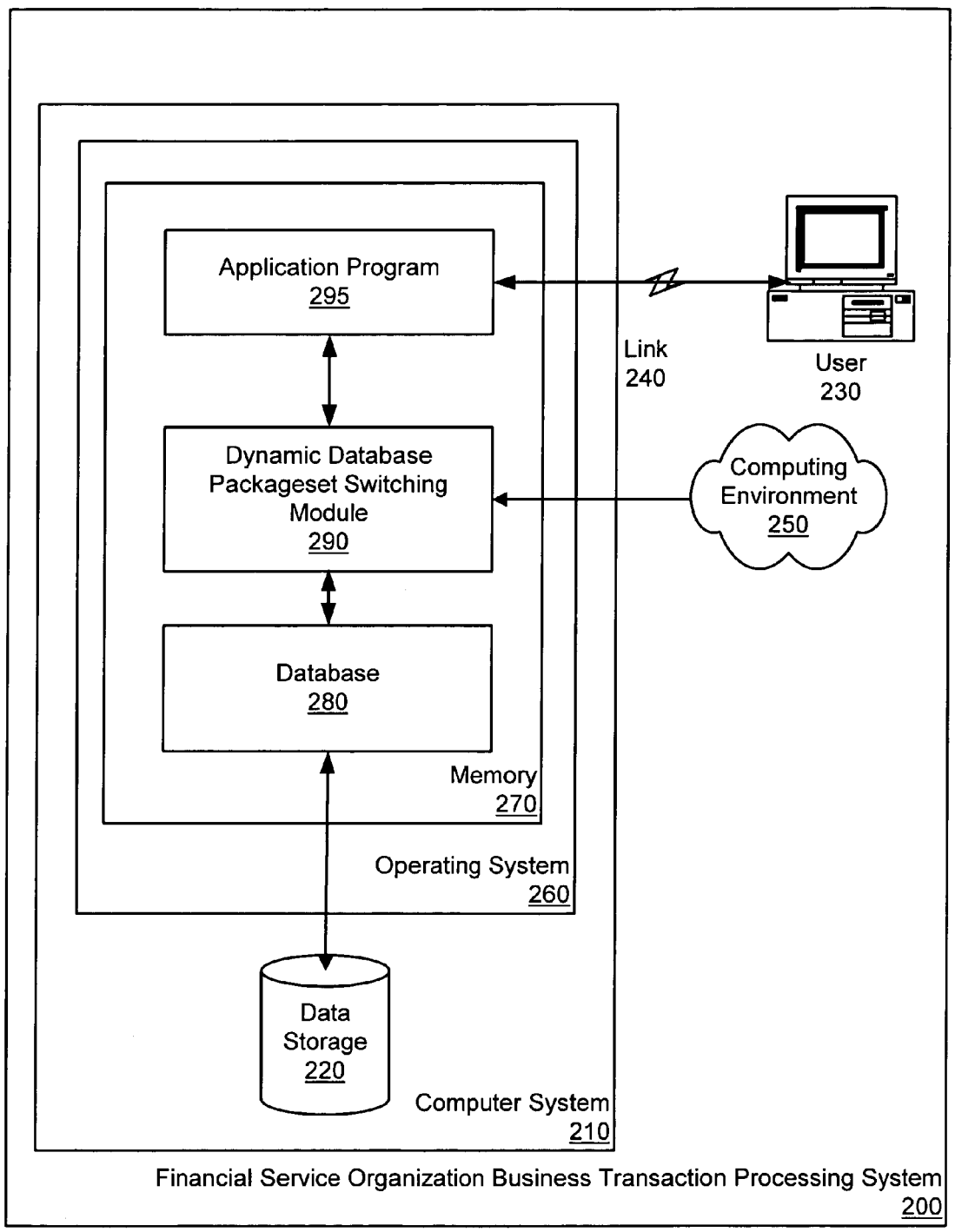
FIG. 2 is a block diagram illustrating the architecture of one embodiment of a financial service organization business transaction processing system with an application program, a dynamic database packageset switching sub-system, a computing environment monitoring sub-system, a database sub-system, a data storage sub-system, and a user sub-system in the network.

FIG. 2—A Block Diagram Illustrating One Embodiment of a Financial Service Organization Business Transaction Processing System Utilizing a Dynamic Database Packageset Switching Method In FIG. 2, an embodiment of a financial service organization business transaction processing system 200, utilizing a dynamic database packageset switching method, may include a computer system 210, an operating system 260, a user display screen 230 connected to the computer system via a link 240, a computing environment monitoring software 250 connected to a dynamic database packageset switching software 290, and a database 280 residing on data storage 220. Computer system 210 includes memory 270 configured to store computer programs for execution on system 200, and a central processing unit (not shown) configured to execute instructions of computer programs residing on system 200. Application program 295 is used to interface to and process financial services organization business transactions requested by a user working at a user display screen 230. Application program 295 may be stored in memory 260.

A user working at display screen 230 may execute a transaction associated with Application program 295. The transaction may need data from FSO database 280. FSO database 280 access requests from the Application program 295 are processed by the dynamic database packageset switching module 290. The dynamic database packageset switching module 290 dynamically selects the packageset name associated with the application program. The packageset specified memory location of the requested FSO data and forwards that information to the FSO database 280. The requested FSO data within the FSO database 280 is then retrieved from the data storage 220.

Figure 3:
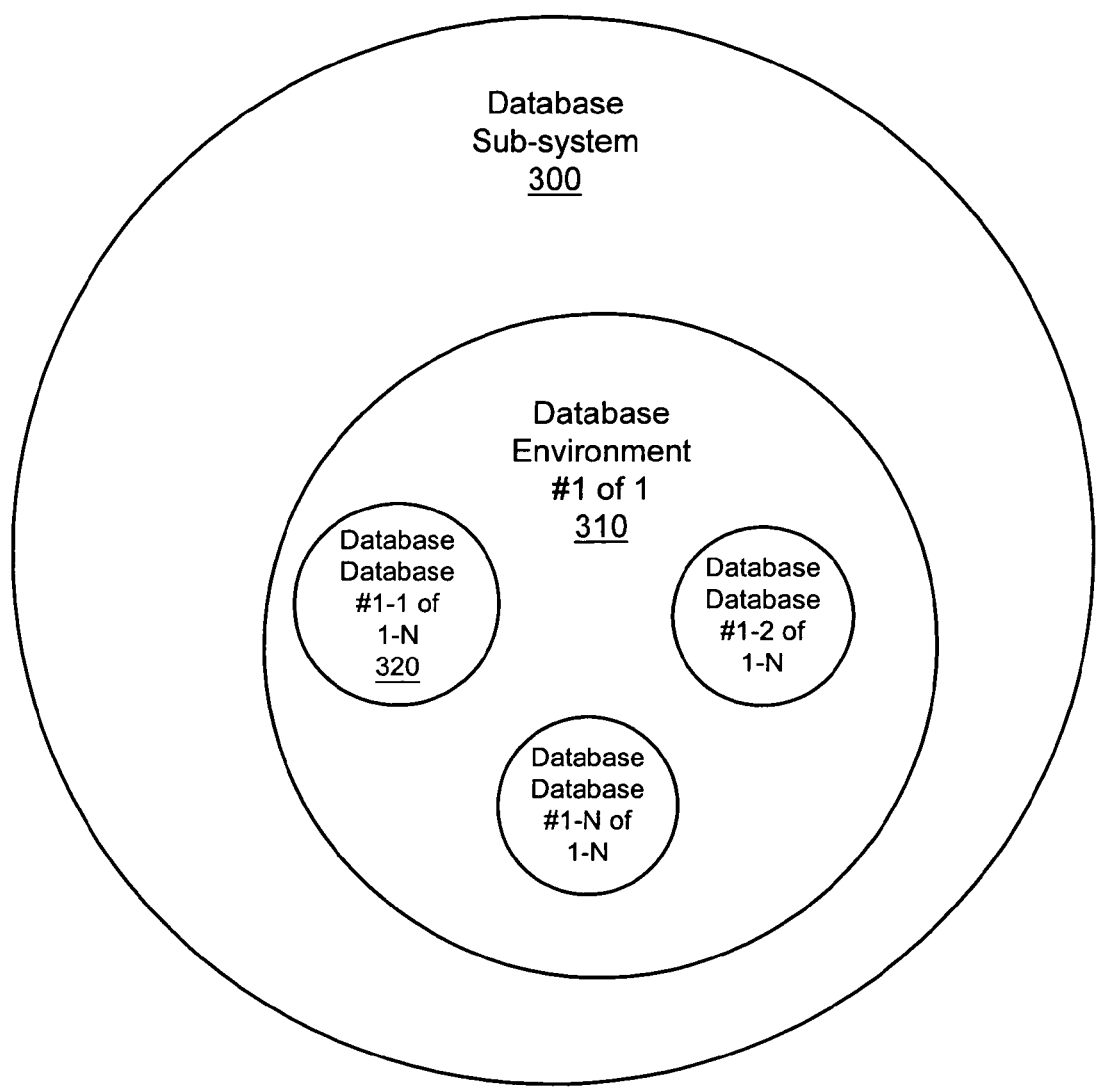
FIG. 3 illustrates a prior art database domain architecture of a financial service organization business transaction processing system with the database domain consisting of a single database sub-system, a single database environment within the database sub-system and one or more databases within the single DB2 database environment.

FIG. 3—A prior art database domain architecture of a financial service organization business transaction processing system FIG. 3 illustrates a prior art database domain architecture of a financial service organization business transaction processing system with the database domain consisting of a single database sub-system 300, a single database environment 310 within the database sub-system 300 and one or more databases 320 within the single database environment 310. Prior art database design and set up restrictions normally limit the financial service organization business transaction processing system to use the single environment within the same DB2 sub-system.

Figure 4:
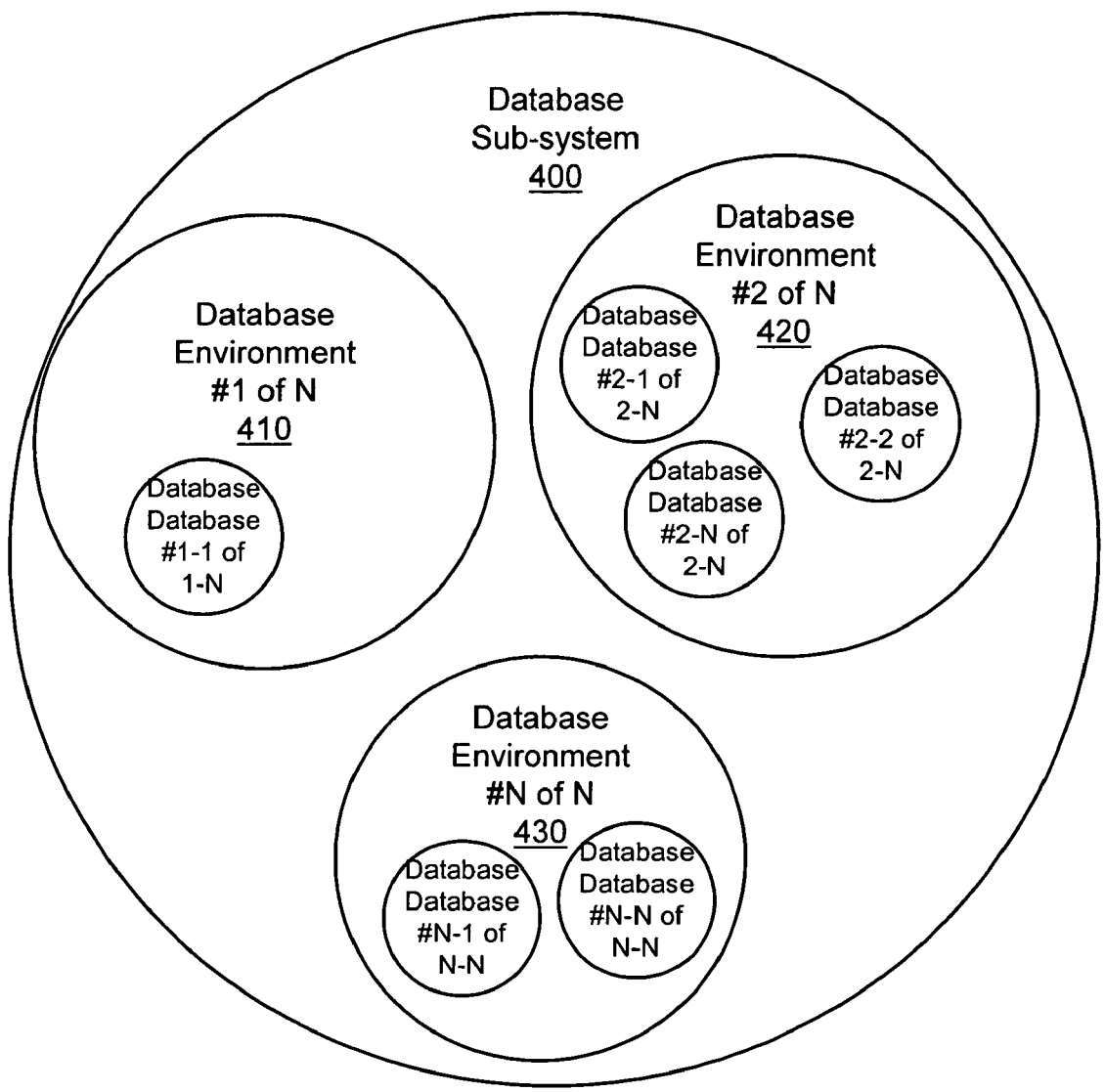
FIG. 4 illustrates a multi-environment, multi-database domain architecture of one embodiment of a financial service organization business transaction processing system with the database domain consisting of a single database sub-system, one or more database environments within the single database sub-system and one or more databases within each of the database environments.

FIG. 4—A Multi-Environment, Multi-Database Domain Architecture of One Embodiment of a Financial Service Organization Business Transaction Processing System FIG. 4 illustrates a multi-environment, multi-database domain architecture of one embodiment of a financial service organization business transaction processing system with a single database sub-system, one or more database environments within the single database sub-system and one or more databases within one of the database environments. The dynamic database packageset switching design is capable of processing, at run time, an FSO database access request from the Application Program which would be independent of the current database environment and database name.

Figure 5:
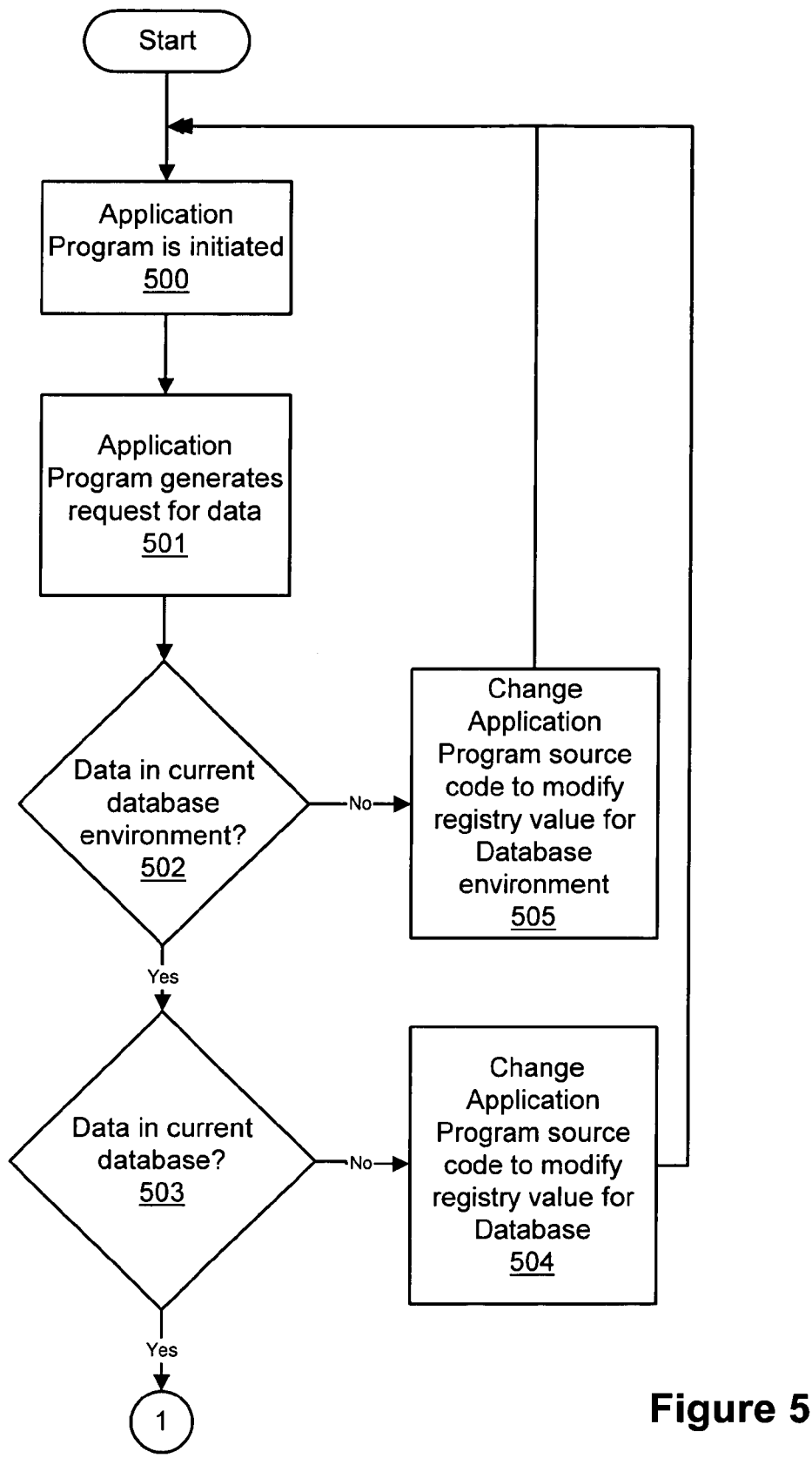
FIG. 5 is a prior art flowchart illustrating the need for modifying application program source code to a change in database environment or an addition of a new database according to one embodiment.

FIG. 5—A Flowchart Illustrating the Prior Art for Processing a Business Transaction which Involves a Change in Database Environment According to One Embodiment;

FIG. 5 is a flowchart illustrating the prior art for processing an FSO business transaction. If the Application Program associated with the business transaction requests data not available in the current database environment or in the current database name then the Application Program source code must be modified. Modifying an application program source code to accommodate a change in database environment or an addition of a new database, according to one embodiment, is time consuming and expensive. In one embodiment, steps 500 and 505 may be performed in a business transaction processing program in the FSO system. The user of the FSO computer may START the prior art FSO processing method by initiating a business transaction. In step 500, the user initiated business transaction may communicate with an application program. In step 501, in response to the user requested business transaction, the application program may generate one or more requests for data from FSO computer database. In step 502, a determination may be made if the requested data is obtainable within the definition of the current environment. If the requested may be obtained in the current environment then program control is passed to step 503. If the requested may not be obtained in the current environment then program control is passed to step 505. In step 505, the user of the FSO computer system may need to change the application program source code, in an off-line mode, to modify the environment registry values used in FSO database definition. In step 503, a determination may be made if the requested data is obtainable within the current database name. If the requested may be obtained in the current database name then program control may be passed to step 510 in FIG. 5*a*. In step 504, the user of the FSO computer system may need to change the application program source code, in an off-line mode, to modify the database registry values used in FSO database definition.

Figure 5A:
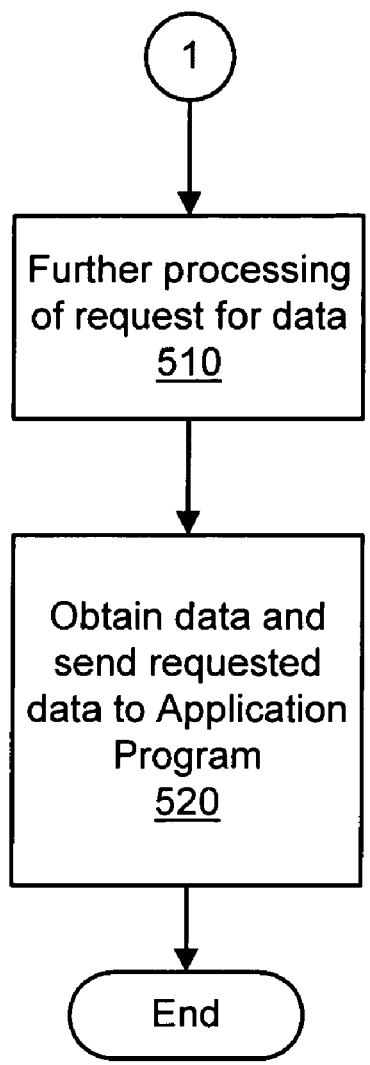
FIG. 5*a* is a continuation of flowchart in FIG. 5.

FIG. 5*a*—A Continuation of Flowchart Illustrated in FIG. 5

FIG. 5*a* is a continuation of flowchart illustrated in FIG. 5. In step 510, in one embodiment, the request for data may be passed on to a database manager in the FSO computer system to physically locate the requested data. In step 520, in one embodiment, the requested data is retrieved and passed on to the originating application program.

Figure 6:
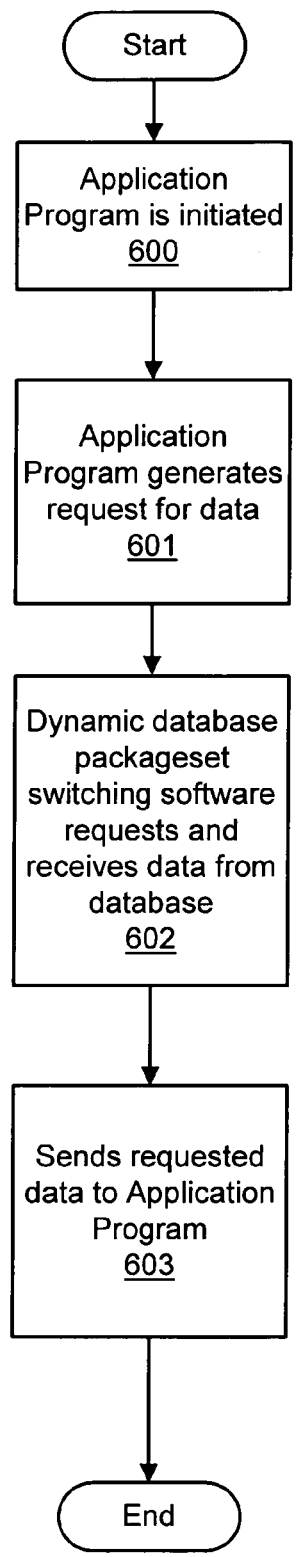
FIG. 6 is a flowchart illustrating the runtime use of dynamic database packageset switching method according to one embodiment.

FIG. 6—A Flowchart Illustrating the Runtime Version of a Dynamic Database Packageset Switching Method According to One Embodiment FIG. 6 is a flowchart illustrating the runtime version of the dynamic database packageset switching method for performing database access during the processing an FSO business transaction. If the Application program associated with the business transaction requests data which may not be available in the current database environment or in the current database name then the dynamic database packageset switching software dynamically changes the environment or the database name without requiring a source code change to access the requested data. In one embodiment, steps 600 and 603 may be performed in a business transaction processing program in the FSO system. The user of the FSO computer may START the dynamic database packageset switching method for performing database access during the processing an FSO business transaction by initiating a business transaction. In step 600, the user requested business transaction may initiate an application program. In step 601, in response to the user requested business transaction, the application program may generate one or more requests for data from the FSO computer database. In step 602, the dynamic database packageset switching method for performing database access obtains the requested data from the FSO database without changing the application program source code. Further detail of step 602 is shown in FIG. 7*b*. In step 603, the dynamic database packageset switching method returns the requested data to the application program.

Figure 7A:
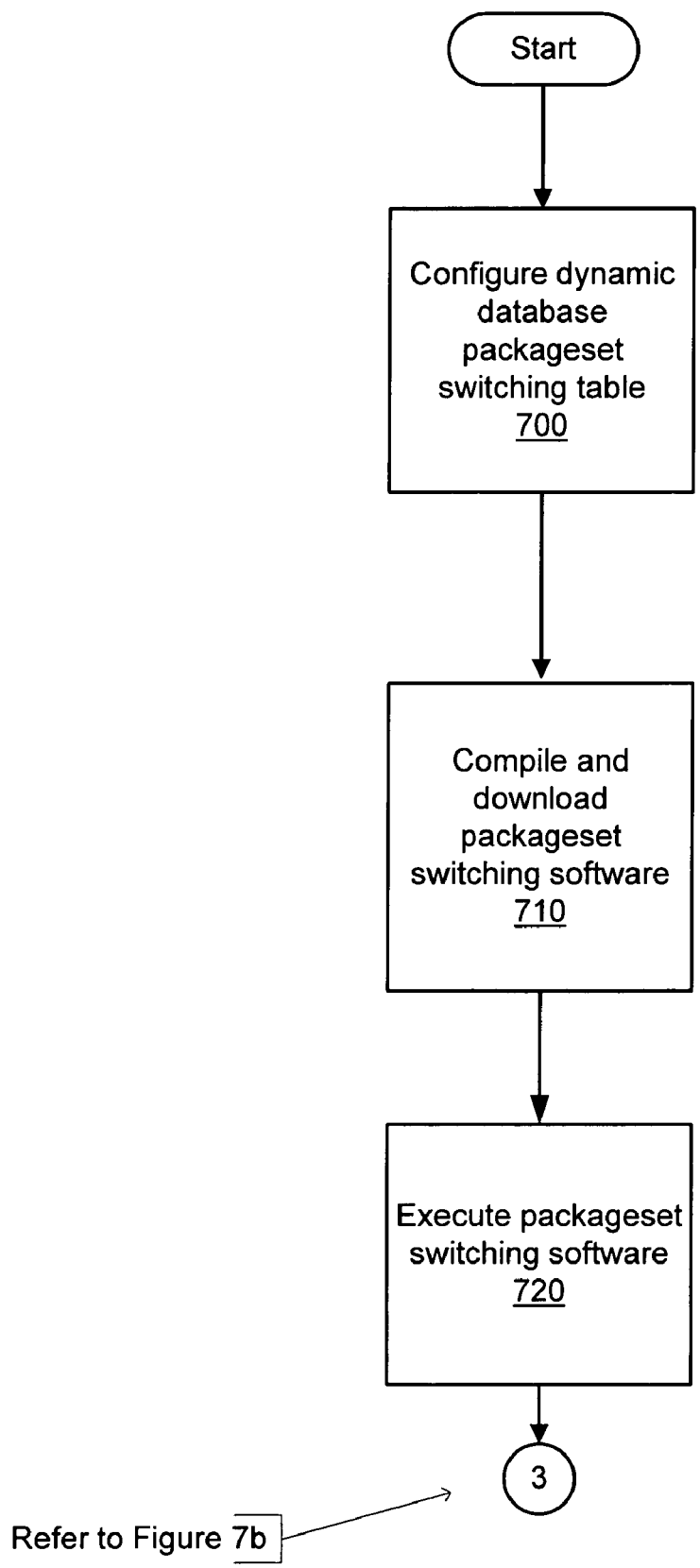
FIG. 7*a* is a flowchart illustrating the configuration and runtime use of dynamic database packageset switching method according to one embodiment.
Figure 7B:
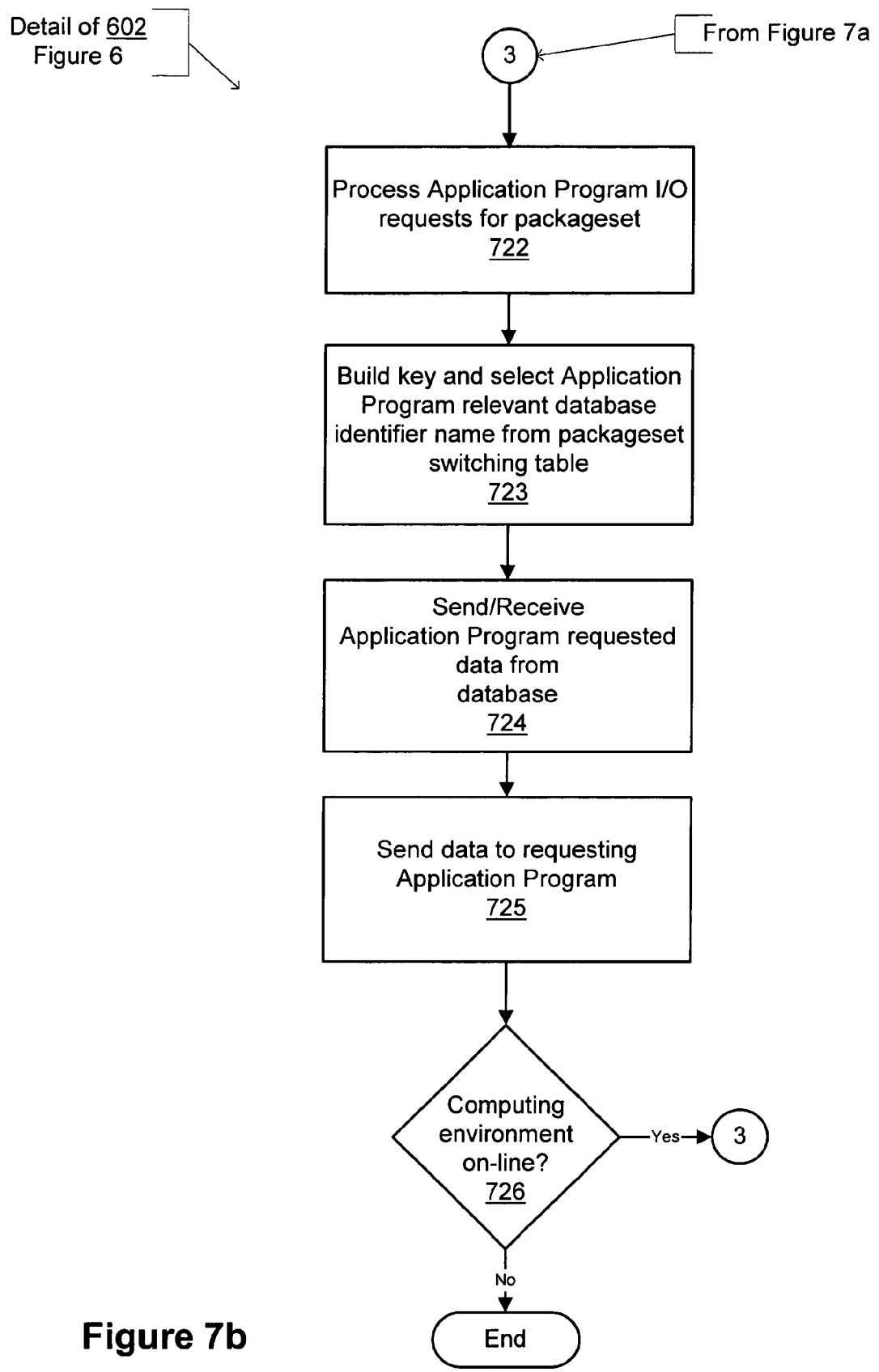
FIG. 7*b* is a continuation of flowchart in FIG. 7*a;*

FIG. 7*a*—A Flowchart Illustrating One Embodiment of the Configuration and Runtime use of Dynamic Database Packageset Switching Method FIG. 7*a* is a flowchart illustrating the configuration and runtime version of the dynamic database packageset switching method for performing database access during the processing an FSO business transaction. In one embodiment, steps 700 through 720 may be performed in a business transaction processing program in the FSO system. The user of the FSO computer may START the configuration of the dynamic database packageset switching method by defining values in a dynamic database packageset switching table. In one embodiment, the dynamic database packageset switching table may consist of data values stored in one or more rows and two columns. Column number one may comprise a database identifier and column number two may comprise a user defined key. The user defined key structure may be defined by selecting one or more data dictionary elements arranged in a specific sequence. The database identifier in column number one may comprise a pointer to the FSO computer database location associated with the value of the user defined key in column number two. The dynamic database packageset switching table configuration method is further detailed in FIGS. 11 through 16. In step 710, the dynamic database packageset switching software may be compiled, generated and downloaded. In step 720, the user may execute the dynamic database packageset switching software.

FIG. 7*b*—A Continuation of Flowchart in FIG. 7*a*

FIG. 7*b* is the continuation of flowchart in FIG. 7*a*. In step 722, the dynamic database switching software receives a request for data stored in the FSO database from the application program. In step 723, the dynamic database switching software program may build a key in real-time, consistent with the user defined key structure defined in step 700. The key may then be used to access the dynamic database switching table to find a database identifier with a matching entry in the user defined key value. In step 724, the dynamic database switching software program may use the database identifier to request data from FSO database. On receiving the requested data from the FSO database, program control may transfer to step 725. The dynamic database switching software program may send the requested data to the application program in step 725. This completes the data request/response cycle for the application program, using the dynamic database switching software program. In step 726, the dynamic database switching software program may constantly monitor if the FSO computer is on-line. If it is on-line, program control transfers to step 722.

Figure 8:
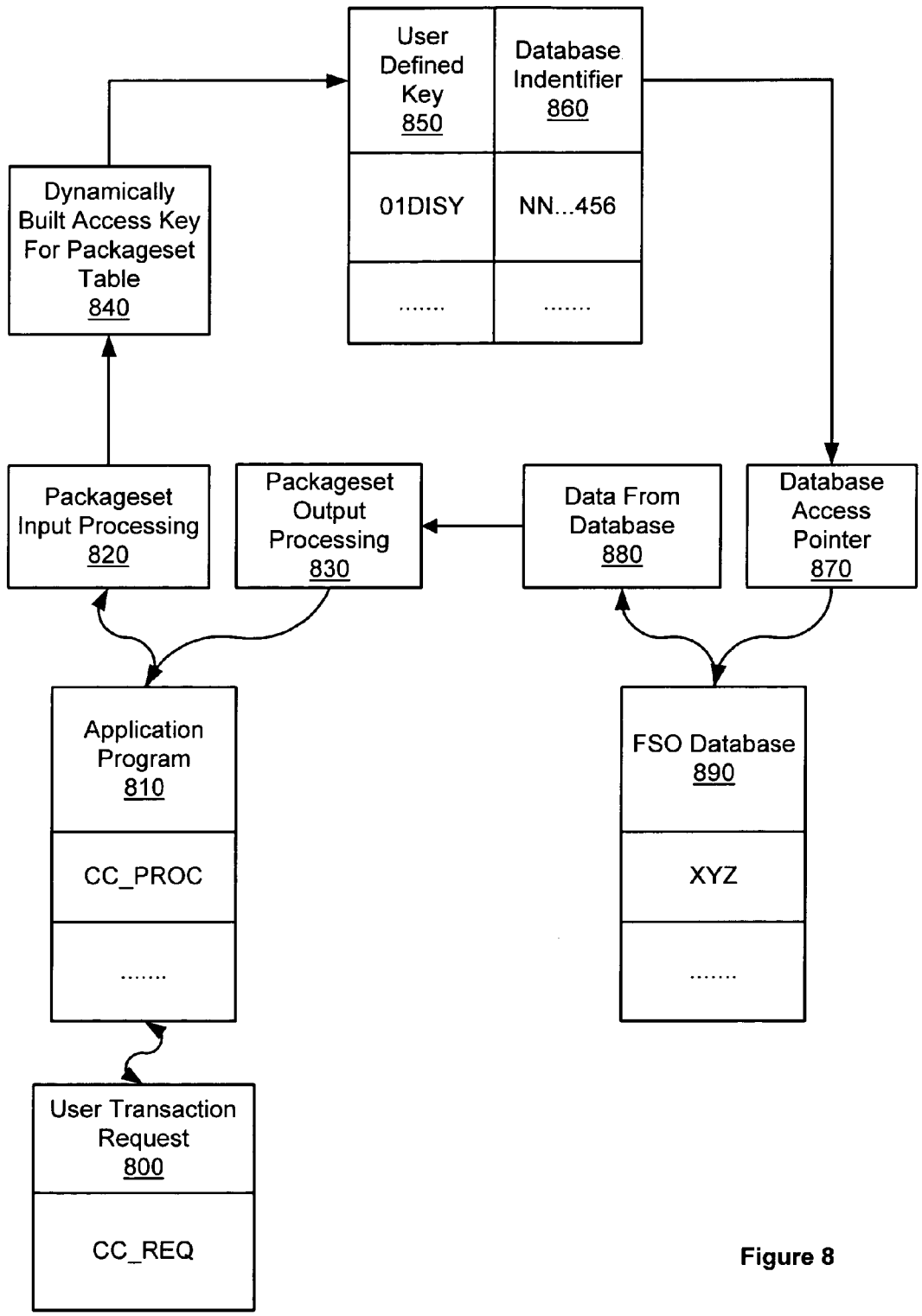
FIG. 8 is a data flow diagram illustrating a dynamic database packageset switching for an associated application program database request according to one embodiment.

FIG. 8—A Data Flow Diagram Illustrating Dynamic Database Packageset Switching for an Associated Application Program Database Request According to One Embodiment FIG. 8 is a data flow diagram illustrating dynamic database packageset switching for an associated application program database request, according to one embodiment. In step 800, a user requests an FSO business transaction. In step 810, an application program associated with the business transaction processes the user request and generates a request for FSO data, which may be required to complete the business transaction, to the dynamic database packageset switching software. In step 820, the input processing portion of the dynamic database packageset switching software may gather additional transaction related information regarding the application program request for FSO data. In one embodiment, this may include the application program name, program variable, location of user and similar other. In step 840, the dynamic database packageset switching software may dynamically create a key to access the dynamic database packageset switching table. In steps 850 and 860, the dynamic database packageset switching software may find a matching user defined key with an associated database identifier. In step 870, the dynamic database packageset switching software may use the database identifier to point to the physical data storage location in the FSO database. In steps 880 and 830, the requested data from FSO database may be returned to the dynamic database packageset switching software which may be passed on to the application program in step 830. The application program may then display requested data to user to complete the user business transaction.

Figure 9:
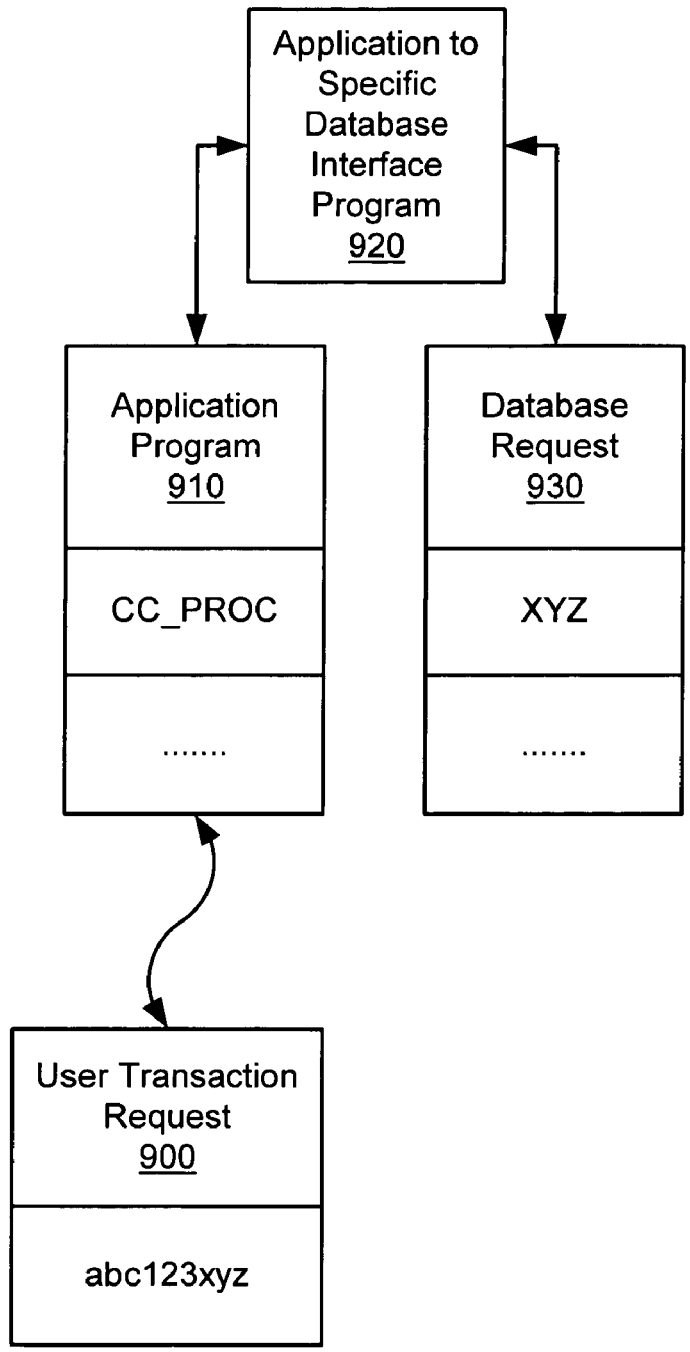
FIG. 9 is a data flow diagram illustrating a legacy method for an application program database request according to one embodiment.

FIG. 9—A Data Flow Diagram Illustrating a Legacy Method for an Application Program Database Request According to One Embodiment FIG. 9 is a data flow diagram illustrating a legacy method for an application program database request, according to one embodiment. In step 900, a user requests an FSO business transaction. In step 910, an application program associated with the business transaction may process the user request and may generate a request for FSO data, which may be required to complete the business transaction. In step 920, the application to specific database interface program may convert the data request to a format understood by the FSO database. In one embodiment, this may include converting the application program data read request written in COBOL to an IBM DB2 database format. In step 930, the requested data from FSO database may be returned to the application to specific database interface program which may be pass on the data to the application program. The application program may then display requested data to user to complete the user business transaction.

FIG. 10—One Embodiment of a Method for Selecting Data Dictionary Data Elements as Key Elements Available for Inclusion in Key Definitions FIG. 10 illustrates one embodiment of a method for a user of an FSO system to select data dictionary data elements as key elements available for inclusion in key definitions in an FSO system. In this illustration, by way of example, the letters A through Z are used to represent the data elements in the universe of data elements in the data dictionary. In one embodiment, the database may include a table including references to all data elements in the data dictionary that are useable in keys. In another embodiment, each data element in the data dictionary may have a useable in keys parameter associated with it. In one embodiment, the useable in keys parameter may be a binary parameter, and may be set to either allow the data element to be used in key definitions or to exclude the data element from use in key definitions. In one embodiment, a particular data element in the data dictionary may be selected, and information about the selected data element including the useable in keys parameter may be presented on a computer display screen. In one embodiment, a list 122 of all data elements in the data dictionary may be presented on a computer display screen 120 to a user of the FSO system. In one embodiment, a current state 124 of the useable in keys parameter may be displayed with each data element. The state of the useable in keys parameter may be displayed in any form suitable to represent a binary parameter. Examples of forms of displaying states of binary parameters include, but are not limited to: textual binary displays such as YES/NO, Y/N, TRUE/FALSE, T/F, 1/0 and ON/OFF, and; graphic binary displays, such as check boxes and radio buttons. In this example, YES/NO is used, with YES representing a useable in keys parameter set to allow the data element to be used in key definitions, and NO representing a useable in keys parameter set to exclude the data element from use in key definitions. A user may change the state of a useable in keys parameter for a data element by changing the displayed state of the useable in keys parameter. In one embodiment, the user may select the useable in keys parameter using a cursor control device and enter the textual representation of the desired state of the useable in keys parameter using an input device. In one embodiment, the user may select data dictionary data elements as key elements available for inclusion in key definitions to monitor the FSO computing environment.

FIG. 11—One Embodiment of a Method for Selecting Key Elements to be Available for Inclusion in a Particular Key Definition from a List of Key Elements Available for Inclusion in All Key Definitions FIG. 11 illustrates one embodiment of a method for a user of an FSO system to select a group of key elements available for inclusion as key elements in a particular key definition in the FSO system. In this illustration, by way of example, the letters A through Z are used to represent the data elements in the universe of data elements in the data dictionary. In one embodiment, a list 132 of all key elements available for inclusion in key definitions may be presented on a computer display screen 130 to a user of the FSO system. In this example, list 132 includes key elements N through Z. Each key element in list 132 may have a useable in key parameter 134 associated with it. In one embodiment, a current state 134 of the useable in key parameter may be displayed with each key element. The state of the useable in key parameter may be displayed in any form suitable to represent a binary parameter. In this example, YES/NO is used, with YES representing a useable in key parameter set to allow the key element to be used in this key definition, and NO representing a useable in key parameter set to exclude the data element from use in this key definition. A user may change the state of a useable in key parameter for a key element by changing the displayed state of the useable in key parameter. In one embodiment, the user may select the useable in key parameter using a cursor control device and enter the textual representation of the desired state of the useable in key parameter using an input device.

FIG. 12—One Embodiment of a Method for Selecting Key Elements for Inclusion in a Key Definition from a List of Key Elements Available for Inclusion in the Key Definition FIG. 12 illustrates one embodiment of a method for a user of an FSO system to select key elements for inclusion in a key definition from a list of available key elements for the key definition in the FSO system. In this illustration, by way of example, the letters A through Z are used to represent the data elements in the universe of data elements in the data dictionary. In one embodiment, a list 142 of all key elements available for inclusion in a particular key definition may be presented on a computer display screen 140 to a user of the FSO system. In this example, list 142 includes key elements V through Z. Computer display screen 140 may also display a "use in this key" parameter 144 and a key element sequence parameter 146 for each key element displayed. The state of the "use in this key" parameter 144 may be displayed in any form suitable to represent a binary parameter. In this example, YES/NO is used, with YES representing a key element selected to be used as a key element in this key definition, and NO representing a key element not selected to be used as a key element in this key definition. A user may change the state of the "use in this key" parameter for a key element by changing the displayed state of the "use in this key" parameter. In one embodiment, the user may select the "use in this key" parameter using a cursor control device and enter the textual representation of the desired state of the "use in this key" parameter using an input device. In this example, the "use in this key" parameter for key elements W, X and Z are set to YES to indicate that W, X and Z are to be used as key elements in the key definition. The key element sequence parameter may be used to specify the order in which the key elements will appear in the key definition. In this example, key element X is set to appear as the first key element, key element W is set to appear as the second key element, and key element Z is set to appear as the third key element.

FIG. 13—One Embodiment of a Key Definition with Examples of Parameters that May be Included in the Key Element Definitions FIG. 13 illustrates an embodiment of a key definition that may have been defined by a user of an FSO system, with key elements displayed on a key definition screen 150. Each key element may include several parameters that define the key element. In one embodiment, the key elements may be displayed as rows on computer display screen 150, with the columns displaying key element parameters. This example shows key elements X, W, and Z. Key element column 152 displays the key element name. Key element sequence column 154 displays the order in which the key elements may appear in the key definition. In this example, key element X is the first key element, key element W is the second key element, and key element Z is the third key element. Element name column 156 may display a data element name. In this example, key element X is Company ID, key element W is the Credit Card Type, and key element Z is ON US/NOT ON US. Field length column 158 may display a length in units for the key element. In one embodiment, the units are 8-bit bytes. In this example, key element X is 2 bytes long, key element W is 3 bytes long, and key element Z is one byte long. Data type column 160 may display a data type for the key element. In this example, key element X is of data type numeric, and key elements W and Z are of data type character.

FIG. 14—One Embodiment of a Dynamic Database Packageset Switching Table for the Key Definition of FIG. 13 with Examples of Key Values and Processing Parameters FIG. 14 illustrates an embodiment of a dynamic database packageset switching table 170 from a database used in an FSO system, with rows including user defined key values 174 and database identifiers 178 associated with the key values. The dynamic database packageset switching table may be used to store user defined key values and the database identifier values associated with the key values. The user defined key values and the database identifier may be entered by a user of the FSO system. In one embodiment, the dynamic database packageset switching table may include pre-defined key values and the database identifier, and the user of the FSO system may add key values and the database identifier to the dynamic database packageset switching table. In one embodiment, the user defined keys may be configured to monitor the FSO computing environment.

The dynamic database packageset switching table may be searched for a particular user defined key value to find the database identifier associated with the key value. In this example, the dynamic database packageset switching table 170 may be used to point to database locations 179 for different key values. The ability for a user of the FSO system to configure key definitions and dynamic database packageset switching tables at configuration time allows the FSO application programs to look up database location for data in a particular transaction based upon attributes of the transaction. For example, an FSO may add a new city branch 175 to process business transactions for Location 14. The user may include one or more attributes (data elements) of the transaction as key elements in the key definition and define a database pointer 179. In this example, the FSO may be able to add new locations, such as adding Location 14, and process business transactions by merely configuring the dynamic database packageset switching table 170 and without changing any application program source code.

Figure 15:
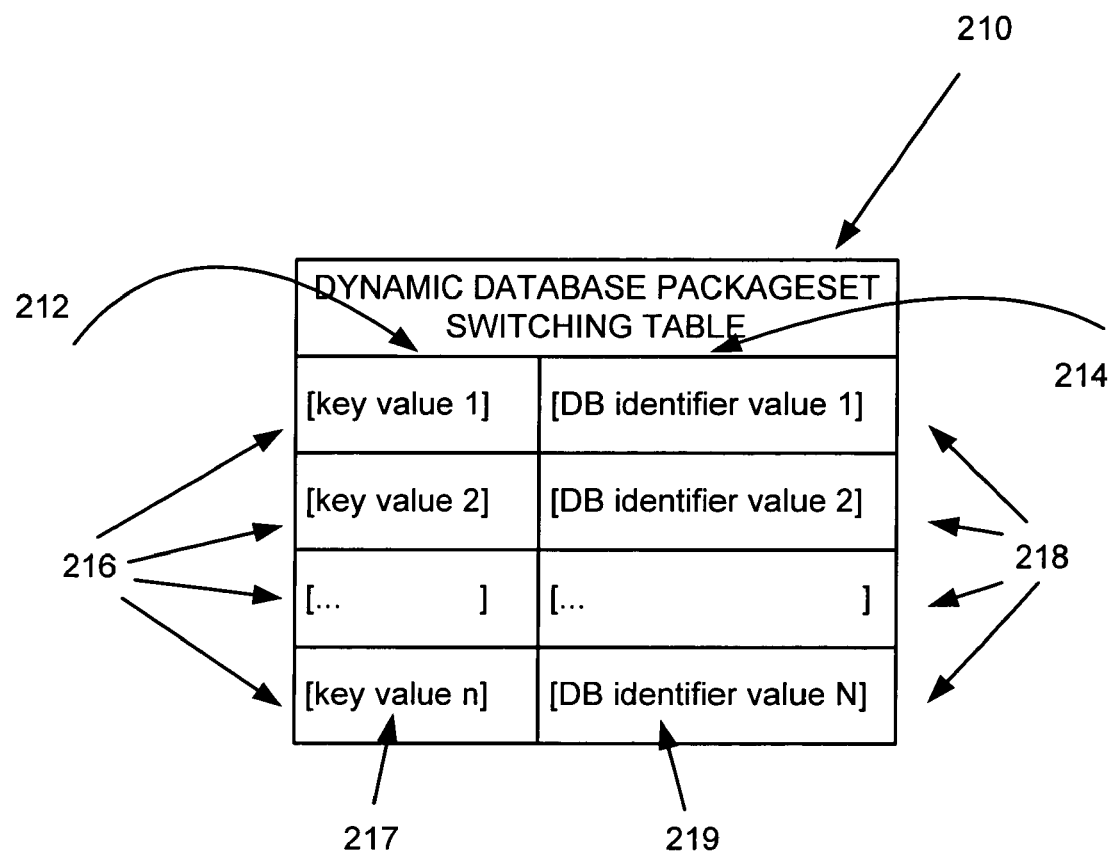
FIG. 15 illustrates one embodiment of a dynamic database packageset switching table in an FSO system.

In one embodiment, each row 172 in table 170 holds one key value and its associated database identifier value. In one embodiment, each key value is unique among the key values in the dynamic database packageset switching table. Each key definition is associated with one database identifier value in the dynamic database packageset switching table. A key value may be constructed from the key element values stored in the one or more key elements defined in the key definition for this dynamic database packageset switching table. In this example, the key values are constructed from key elements X (175), W (176), and Z (177), as defined in key description 150 illustrated in FIG. 14. In FIG. 15, row 1's key value is (12, VIS, Y). The database identifier value corresponding to the key value of (12, VIS, Y) is NN1234567890123456. Searching the dynamic database packageset switching table 170 for the key value of (12, VIS, Y) will return the database identifier value of NN1234567890123456.

FIG. 15—One Embodiment of a Dynamic Database Packageset Switching Table in an FSO System FIG. 15 illustrates one embodiment of the dynamic database packageset switching table 210 in an FSO system database. Dynamic database packageset switching table 210 may include cells 216 for storing user-defined key values 217 in one column 212 and cells 218 for storing user-defined database identifier values 218 in a second column 214. One row in each table may include one cell 216 for storing a user-defined key value 217 and one cell 218 for storing the user-defined database identifier value 219 associated with the key value. In this example, in Dynamic database packageset switching table, user defined key values (1, 2, . . . , n) correlate to database identifiers (1, 2, . . . , n).

In one embodiment, cells 216 for storing key values 217 may be of a pre-configured fixed size that is identical for all dynamic database packageset switching tables 210. In this embodiment, the fixed size of cells 216 may be pre-configured large enough to store key values 217 of the maximum size anticipated by the user of the system. In one embodiment, if the pre-configured size of cells 216 is not large enough, the dynamic database packageset switching tables may be re-configured with a larger fixed size for cells 216.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of configuring a dynamic database packageset switching program comprising:
   obtaining a database comprising processing parameter values used in processing financial transactions, wherein each processing parameter is associated with a predetermined financial transaction;
   displaying a plurality of key elements on the display screen, wherein the key elements comprise data from financial transactions;
   selecting one or more of the displayed key elements;
   creating a key definition, wherein the key definition comprises one or more of the selected key elements;
   associating one or more processing parameters with the key definition, the association process comprising:
      entering a key value for each of the key elements of the key definition in a first field of a template displayed on a display screen of a monitor coupled to an FSO computer system, wherein the combination of key values identifies the predetermined financial transaction; and
      associating a database identifier with the key values entered in the first field by entering the database identifier in a second field of the template displayed on the display screen, wherein the database identifier entered in the second field of the template comprises a database location of one or more processing parameters used to process the financial transaction identified by the key values entered in the first field; and
   storing the entered key value and the database identifier in a first memory coupled to the FSO computer system.

2. The method of claim 1, wherein the database is a relational database.

3. The method of claim 1, wherein the key value comprises two or more key elements, and wherein the method further comprises specifying a sequence in which the key elements appear in the key value.

4. The method of claim 1, wherein the dynamic database packageset switching program is configured during installation of a financial service organization system.

5. The method of claim 4, wherein the dynamic database packageset switching program is further configured after installation of a financial service organization system.

6. A carrier medium comprising program instructions, wherein the program instructions are executable by a computer system to implement a method of configuring a dynamic database packageset switching program, the method comprising:
   obtaining a database comprising processing parameter values used in processing financial transactions, wherein each processing parameter is associated with a predetermined financial transaction;
   displaying a plurality of key elements on the display screen, wherein the key elements comprise data from financial transactions;
   selecting one or more of the displayed key elements;
   creating a key definition, wherein the key definition comprises one or more of the selected key elements;
   associating one or more processing parameters with the key definition, the association process comprising:
      entering a key value for each of the key elements of the key definition in a first field of a template displayed on a display screen of a monitor coupled to an FSO computer system, wherein the combination of key values identifies the predetermined financial transaction; and
      associating a database identifier with the key values entered in the first field by entering the database identifier in a second field of the template displayed on the display screen, wherein the database identifier entered in the second field of the template comprises a database location of one or more processing parameters used to process the financial transaction identified by the key values entered in the first field; and
   storing the entered key value and the database identifier in a first memory coupled to the FSO computer system.

7. The carrier medium of claim 6, wherein the database is a relational database.

8. The carrier medium of claim 6, wherein the key value comprises two or more key elements, and wherein the method further comprises specifying a sequence in which the key elements appear in the key value.

9. The carrier medium of claim 6, wherein the dynamic database packageset switching program is configured during installation of a financial service organization system.

10. The carrier medium of claim 9, wherein the dynamic database packageset switching program is further configured after installation of a financial service organization system.

11. A system comprising:
   a computer program;
   an FSO computer system;
   a database, wherein the database comprises processing parameter values used in processing financial transactions, wherein each processing parameter is associated with a predetermined financial transaction;
   wherein the computer program is executable on the FSO computer system to execute:
      displaying a plurality of key elements on the display screen, wherein the key elements comprise data from financial transactions;
      selecting one or more of the displayed key elements;
      creating a key definition, wherein the key definition comprises one or more of the selected key elements;
      associating one or more processing parameters with the key definition, the association process comprising:
         entering a key value for each of the key elements of the key definition in a first field of a template displayed on a display screen of a monitor coupled to the FSO computer system, wherein the combination of key values identifies the predetermined financial transaction; and
         associating a database identifier with the key values entered in the first field by entering the database identifier in a second field of the template displayed on the display screen, wherein the database identifier entered in the second field of the template comprises a database location of one or more processing parameters used to process the financial transaction identified by the key values entered in the first field; and
      storing the entered key value and the database identifier in a first memory coupled to the FSO computer system.

12. The system of claim 11, wherein the database is a relational database.

13. The system of claim 11, wherein the key value comprises two or more key elements, and wherein the method further comprises specifying a sequence in which the key elements appear in the key value.

14. The system of claim 11, wherein the dynamic database packageset switching program is configured during installation of a financial service organization system.

15. The system of claim 14, wherein the dynamic database packageset switching program is further configured after installation of a financial service organization system.

* * * * *